United States Patent [19]

Chueh

[11] 4,439,830

[45] Mar. 27, 1984

[54] COMPUTER SYSTEM KEY AND LOCK PROTECTION MECHANISM

[75] Inventor: Richard J. Chueh, Saratoga, Calif.

[73] Assignee: Control Data Corporation, Minneapolis, Minn.

[21] Appl. No.: 319,338

[22] Filed: Nov. 9, 1981

[51] Int. Cl.³ .............................................. G06F 7/02
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,839,706 | 10/1974 | Borchsenius | 364/200 |
| 4,096,561 | 6/1978 | Trinchieri | 364/200 |
| 4,096,568 | 6/1978 | Bennett et al. | 364/200 |
| 4,104,718 | 8/1978 | Poublan et al. | 364/200 |

*Primary Examiner*—Thomas M. Heckler

*Attorney, Agent, or Firm*—Edward L. Schwarz; Joseph A. Genovese

[57] ABSTRACT

A computer virtual memory system key-lock mechanism providing for a variety of key-lock tests and key changes depending on the type of instruction involved. This key-lock mechanism provides the opportunity for users to share use of programs and data in conjunction with the keys and locks assigned to individual users by the facility manager. The mechanism prevents unauthorized access to data and programs simultaneously present within the computer. The invention is mechanized by use of tables which record the keys and locks associated with each segment of data or code. Hardware tests each data or code segment access for compatibility between the keys and locks and causes the memory reference to be rejected if disagreement exists. The keys and locks are short digit sequences associated with the user and referenced segments.

8 Claims, 7 Drawing Figures

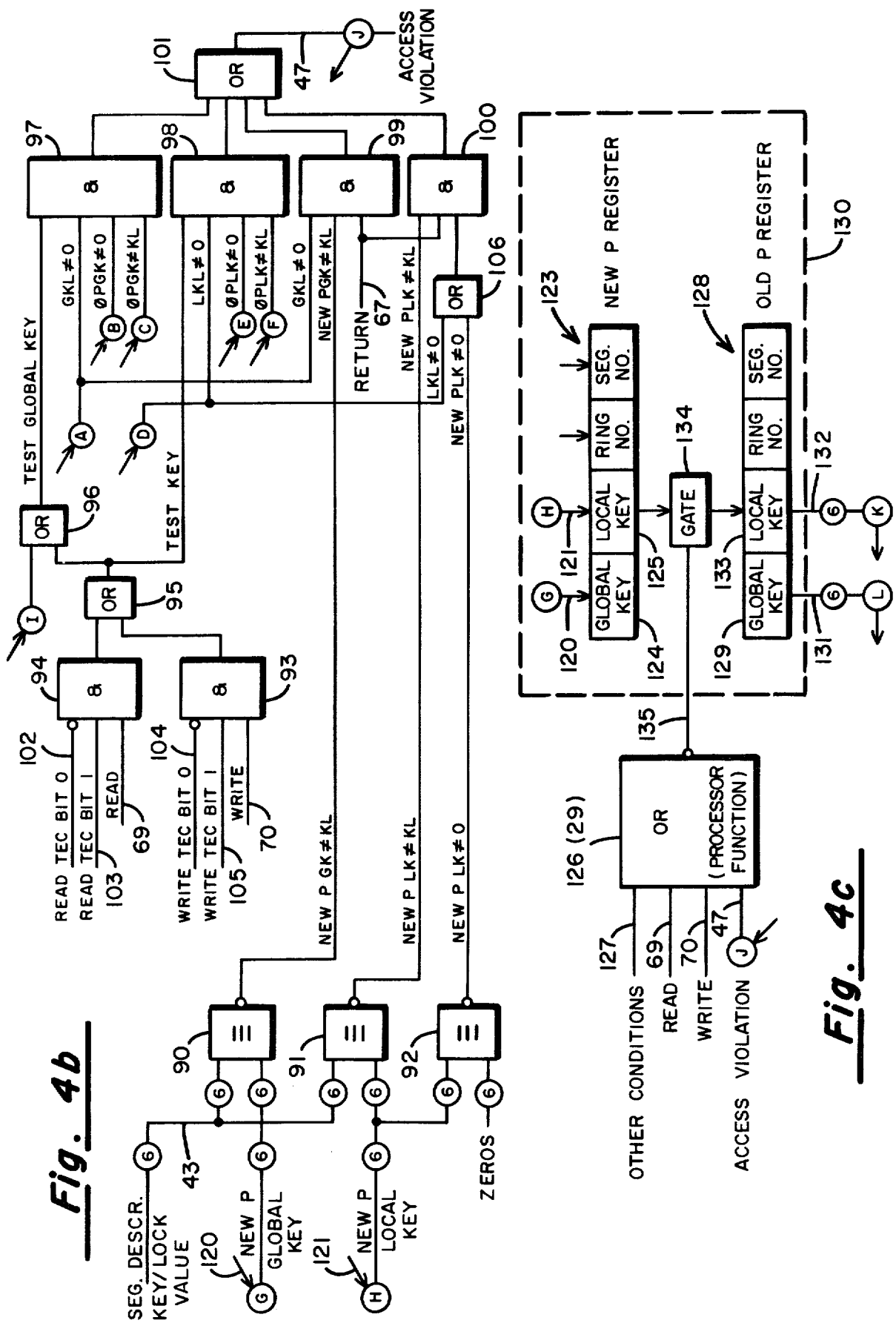

COMPUTER SYSTEM KEY AND LOCK PROTECTION MECHANISM

BACKGROUND OF THE INVENTION

In modern, large scale computer installations, it is typical that users will alternately receive processing of portions of their project for short periods of time. For example, a single computer servicing many video terminals will skip from terminal to terminal on a demand basis. It is therefore inefficient to remove the code and data for all but the current user from the machine. In addition, not infrequently several users will be sharing certain code or data. In the video terminal example, the users may all be setting type or may be interacting with a single educational program. Or, all programmers in a computer installation may be using at times one or more of the compiling programs available. If a data base has been created, all users may have access to at least portions of this data base, and thus it will never be removed from the system. Even very large data bases and programs can be held constantly within the computer's memory through the use of virtual addressing.

Through the use of virtual addressing, literally the entire mass storage of the installation is made available to each individual user on a demand basis. The requirements of users of large computer installations are typically substantially less than the entire capabilities of the installation. Therefore, each user's private code and data are always present in the system and theoretically available to other users.

In most situations, this is not a desirable condition. The users may be direct competitors of each other in a service bureau environment. Some users may dishonestly wish to gain access to other users' information. Individual users may have untested code which can unintentionally destroy other users' information. Some users may have classified information in the system which must not be available to users without the requisite classification level and need to know. There is, therefore, substantial motivation for providing computational facilities which can provide service to large numbers of users and at the same time isolate each user from all others.

An additional complication is the situation where a plurality of users will be sharing the same code. That is, at different times in the processing duties of the machine, different users will be executing the identical code with, perhaps, different data. The compiler is one example where each user's input data has different source code, and each user's object code forms the output.

Digital keys and locks are being used as at least a Partial solution to these problems. A digital key is simply a unique sequence of bits assigned to a particular user or program. A lock is a similar sequence of bits assigned to a resource of the computing system. This resource may be a peripheral device, data tables, program code or memory area within the central processor. Before access to a particular resource is permitted, the key assigned to the requesting user is compared with the lock assigned to the resource, and if unequal the requesting user is denied use of the requested resource. The central processor contains hardware and/or software which prevents any user from subverting the key-lock testing process by, for example, altering a key or lock or by disabling the testing process.

U.S. Pat. No. 3,938,100 explains the basics of lock and key implementation. This patent teaches the use of a register which contains several keys, and a page table (which corresponds approximately to the segment tables of this description) containing a lock value for each active page in the memory. A memory reference is permitted only if one of the key codes matches the lock code associated with the referenced page. In this manner, a supervisory routine which alone has access to the lock and key values, can exclude any user from referencing or executing within all pages except for those whose locks correspond to one of the four key values. Lockout bits select the type of memory operations permitted for those pages whose locks match the keys associated with each lockout bit collection.

BRIEF DESCRIPTION OF THE INVENTION

U.S. Pat. application Ser. No. 136,731, filed Apr. 2, 1980, now U.S. Pat. No. 4,356,549, and having a common inventor and assignee with this application, teaches the implementation of a virtual addressing scheme which employs a two-step address conversion procedure. (Ser. No. 136,731 is hereby incorporated by reference into this application.) In the first step, a process virtual address (PVA) is converted to a system virtual address (SVA). The SVA may be identical for different PVAs if different users (each having their own process) are attempting to use the same code or data. In this context, the operation of keys and locks according to the instant invention provides a different key for each user which is assigned at the time the user is allowed to begin operation within the system. A user's key is tested for equality with the lock of each segment to which access is requested, at the time the pVA is converted to the SVA. Inequality causes the hardware to refuse access to the requesting process. As certain users make reference to other users' segments in the various ways possible, the key values and lock values are tested and changed according to the type of reference made, so as to permit access by authorized users and to prevent unauthorized users' access to other users' information. This prevents those users which are to be governed by key and lock safeguards from subverting the intended protection when called by users who have been granted the right to operate with a master key. (Users' references with a master key are not subjected to key-lock testing.) By software convention users will be allowed to operate with master keys in only carefully controlled situations.

In this implementation, the key with which a sequence of instructions is operating, is made a portion of the P, or instruction counter register. With the memory organized in segments, each segment is provided with its own lock which is applicable for all of the addresses within that segment. In fact, is it convenient to have two keys, a global and a local, assigned for each instruction sequence, although only a single numeric lock value is preferred for the individual segments. This value can be either global or local or both depending on selector bits associated with the segment's descriptor. Whenever the segment supplying instructions is changed, the keys contained in the P register may also be changed according to algorithms and conditions dependent on the key and lock values and the way the segment change occurs. In fact, how these keys are selected is an important distinguishing factor of my invention. Depending on the instruction being executed, the global or local key in the P register may be changed.

Accordingly, one purpose of this invention is to isolate the various users of a computer system from each other.

A second purpose is to provide such isolation during execution of various control-transferring instructions.

Another purpose is to provide various levels of isolation between users, dependent on assignments made by the facility manager.

Still another purpose for this invention is to permit such isolated users to employ the same code sequences and data bases within the system.

Other objects and purposes will become apparent during the following discussion and description.

BRIEF DESCRIPTION OF THE DRAWINGS

FIGS. 4a and 4b in combination form a detailed logic diagram of the apparatus implementing a major portion of this invention.

FIG. 4c is a block diagram of the specialized P register forming a portion of the invention's preferred embodiment.

DESCRIPTION OF THE PREFERRED EMBODIMENT

Introduction

The understanding of the following description requires one first to grasp some general principles and conventions involved in the implementation of the large scale computers in which this invention is intended to play a role. It is the custom to provide large portions of the function within such computers through the use of microprocessor circuitry which is micro-programmed (i.e., controlled with microcode) to provide these functions. It is also not unusual to provide a portion of these functions in hardwired circuitry which is not capable of being microprogrammed. Both approaches are used for substantial portions of the preferred embodiment of this invention. This leads to problems of accurately displaying the preferred embodiment in an understandable and logical fashion. I choose to represent the microprogrammed portions of this invention in functional block diagram form. Since the microprogramming portion of the implementation of this invention in the actual embodiment is employed for simple interface and signal transfer between the other portions of the computer and this invention, it seems that one of ordinary skill in the art will have no need to experiment in applying this invention to a different computer design, avoiding the necessity of a more detailed exposition of the microprogramming. The larger and more complex portion of the invention is in fact implemented in hardware, and this hardware is disclosed and explained at the logic element level.

Memory Organization

Figure 1:
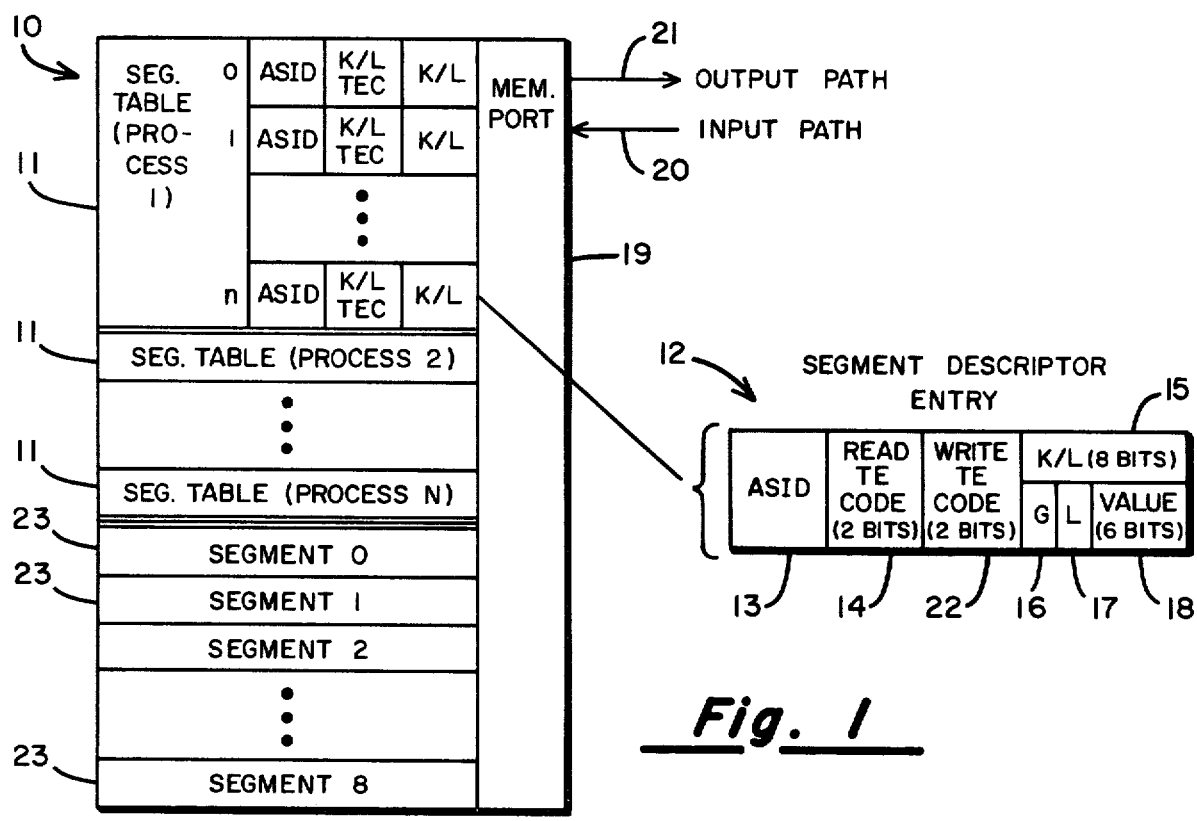
FIG. 1 is a map of the organization of the main memory.

Turning first to FIG. 1, the map of main memory 10 shown therein comprises, for the purposes of this invention, two distinct portions, the ASID (active segment identifier) and the key/lock information. In understanding this organization, it is useful to refer to the previously mentioned U.S. Pat. application Ser. No. 136,731, wherein the addressing structure existing in the computing system employing the instant invention is treated in great detail. The aforementioned SVA comprises the so-called ASID and a byte number. The SVA is the "real" virtual address of the machine's instructions, according to the teachings of U.S. Pat. application Ser. No. 136,731. Each user's process is assigned its own set of PVAs, each PVA in turn comprising a segment number and a byte number. In the memory 10 shown in FIG. 1, the segment numbers are in every case values from 0 through n, where n can be some preselected maximum value. By using the segment number of a PVA as an index into the process's segment table, the ASID, K/L, and other information as well can be extracted.

Thus, in FIG. 1, one segment table 11 is that table which is assigned to a hypothetical process 1. Each segment table 11 comprises a series of segment descriptor entries 12, each assigned to one segment and one of which is shown in expanded form in FIG. 1. In addition to the ASID field 13, the segment descriptor entry (SDE) 12 also includes a read test enable code (TEC) 14, a write test enable code 22, both of which in the preferred embodiment are 2 bits, and a K/L or key/lock field 15 of 8 bits. K/L field 15 is further subdivided into a one bit G designator field 16, a one bit L designator field 17 and a 6 bit value field 18. The read and write TECs 14 and 22 each have only a single meaning relevant here. A code of 01 (binary) in each case specifies that key-lock testing shall occur for each reference to the segment. Every other bit pattern disables key-lock testing.

The K/L field 15 specifies the actual bit pattern which forms the two locks which are encoded within each segment descriptor entry 12. The ramifications and implementation of these two lock values will be discussed later, but for purposes of explaining the segment table organization, it is necessary to simply understand that a global lock and a local lock are associated with each segment. The global lock value is 0 if either value field 18 is 0 or the G designator field 16 is 0, and equal to the value field otherwise. Similarly, the local lock value is either that bit pattern contained in value field 18, or regardless of the contents of value field 18, 0 if L designator field 17 is 0.

In each segment table 11 (which need not be, as shown, contiguous with one another) a series of segment descriptor entries 12 are arranged in sequential order and indexed with the number of the segment to which they are assigned. There can be any number of segment tables up to a maximum preselected value shown as N in FIG. 1.

A second portion of main memory 10 is devoted to actual storage of the data and instructions which the actual processor uses in performing its tasks. As in all virtual memories, this portion of the memory is arranged in segments 23 which are again sequentially numbered from 0 through some preselected value S, which is dependent on the "size" of the virtual memory involved and the size of the individual segments. Memory port 19 for this virtual main memory corresponds to the actual physical port for the real memory. The contents of memory 10 can be written and read through data paths 20 and 21 in the usual fashion, with read and write address signals specifying the function and address also being sent to memory 10 on path 20. Depending on the organization of a particular computing system, the memory 10 and memory port 19 may be explicit and well defined, with a location on a separate board, chassis or cabinet, or may be very tightly entwined with the computer hardware devoted to instruction decoding, arithmetic and logic operations, and input/output operations.

Key-Lock Description

It is useful at this point to discuss the operation of this key-lock mechanism in a purely verbal manner before describing the operation of the invention with reference to the remaining Figs. At any given time within a computer employing a preferred version of this invention, there are a single global key and a single local key which have been selected by previous operations and which pertain to all instructions executed by the computer. These keys form a portion of P register 130 (FIG. 4c), although P register 130 in the preferred hardware embodiment does not simply contain the address of the next sequential instruction, but contains other control and isolation information in addition to these keys. The general principle is that if the SDE for the segment which contains the operand specified by a particular instruction does not contain a global lock and a local lock which is identical to the global key and local key respectively of the current P register, then an access violation has occurred and the processing of that instruction and the process containing it is aborted.

There is, however, a provision for a "master" key, both global and local, for the P register, and an inoperative lock condition for the segment involved. A master key is denoted when the key value is 0. An inoperative or "no" lock condition is denoted in the K/L field 15 of FIG. 1 by a bit pattern representing 0 for the lock type involved. Thus, if the G field 16 of SDE entry 12 is 0, the L field 17 is 1, and the value field 18 is 3, then the global lock value is 0, and the local lock value is 3. If both G (global) and L (local) fields 16 and 17 are 1 and the value field 18 contains 0, then both global and local locks would be 0 and the segment would be "no-locked." The master key value, either global or local implies that the key-lock restriction mechanism cannot prevent access to a segment having respectively a non-zero global or local lock. Similarly, even though the keys being employed at any given time are nonzero, i.e. not master keys, yet if the corresponding K/L, field of the referenced SDE is 0, i.e. has an inoperative lock, then access to such a segment is still available.

If a particular segment is associated with a nonzero lock field which does not equal a corresponding nonzero key, then an access violation occurs and the proposed memory reference is rejected. Both global and local keys must pass the equivalency tests to establish the right of access. It should be noted that even if one key or lock is 0, the other (global or local) nonzero key-lock set is tested in this preferred embodiment. Another system may well adopt a different convention.

When analyzing the operation of the key and lock mechanism within the preferred computing system, it is useful to divide the types of instructions which can be executed by the processor into two different groups. On the first hand, there are the read and write class instructions which straightforwardly make references to the virtual memory, extracting data and instructions from and transmitting data to the memory 10. These instructions are implemented for purposes of this invention, by simply testing the global and local key against the global and local locks in the SDE for each referenced segment.

The second and more complex type of instruction causes an actual change in the global and/or local keys forming a part of P register 130. Full-fledged key-lock equivalency tests may or may not be performed depending on the particular instruction being executed. In the case of the Exchange instruction, the P register value is replaced with an entirely new P register value; hence the old global and local keys are replaced by the new global and local keys. Because execution of an Exchange instruction by a user's program is carefully controlled by the operating system, the user is not able to improperly exploit the change of keys involved.

Other second-type instructions also alter one or both of the keys in the P register. The alterations will always be to make the key affected by such instructions no more powerful (i.e. change master to non-master) then it was previously. One source for the values to which these keys may be changed by these instructions is the K/L field 18 in segment descriptor entry 12, hence the "key/lock" terminology. These operations do occur with some key to lock equivalency tests so an attempt to improperly gain a key for access to off limits segments will still cause an access violation signal to occur.

The first of these instructions are the Call and its complementary function, Return. The Call instruction is employed when an executing program wishes to tranfer control to a separate, unrelated program and then receive control back from it at a later time. The Call instruction includes a mechanism for transferring the address within the program containing it to which the called routine shall return control when the called routine's processing has been completed. The Return instruction simply transfers contol back to the routine from which the Call instruction was executed. The Inter-Segment Branch (ISB) instruction is quite similar to the Call instruction with respect to manipulations and tests involving the keys and locks. Because there is no return address, there are differences in operation involving this aspect.

Block Diagram

Figure 3:
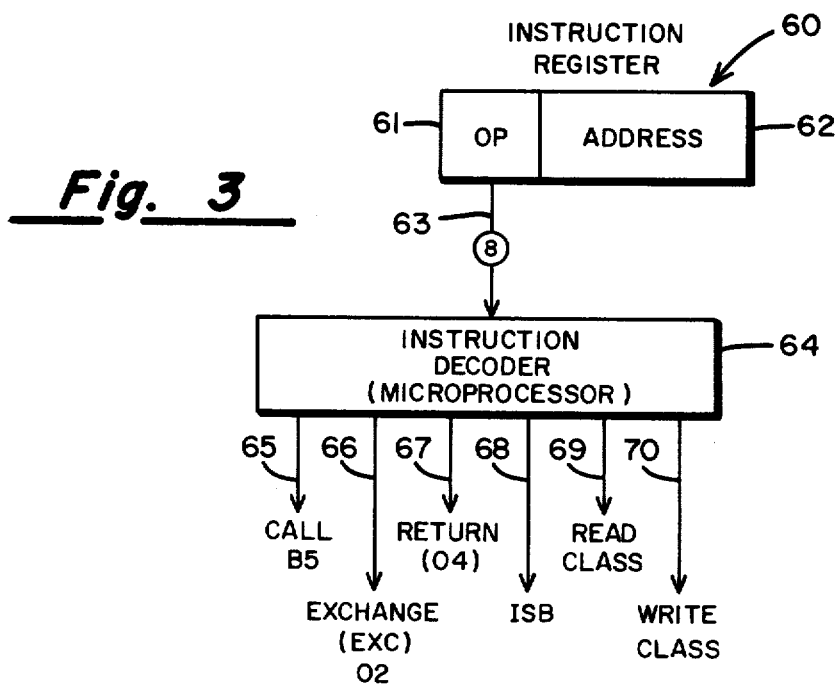
FIG. 3 is a block diagram of the instruction decoding apparatus pertinent to the explanation of this invention.

With this background, the apparatus represented by the remaining Figs. can be more easily understood. FIG. 3 depicts in block diagram form the standard operation decoding function performed by the microprocessor portion of the central processor here involved. The decoding results are unchanged by the manner in which the decoding is performed. The distinction is simply that when a microprocessor is employed for such tasks, the very same logic elements which perform one task at one time may, when operating under control of different microcode at a different time, perform different tasks.

In the implementation of instruction decoding, instruction register 60 (which may be a portion of the microprocessor) comprises an OP code field 61 and an address field 62. No further notice of the address field need be taken at this time. The 8 bit OP code field 61 is transmitted by data path 63 to the microprocessor 29 (FIGS. 2a and 2b) symbolically represented as instruction decoder 64. The output of decoder 64 is a set of operation code flag signals, only one at a time of which may be a logical 1. Thus for the execution for a Call instruction, a logical 1 flag signal will be placed on path 65. The Exchange instruction causes a logical 1 flag signal on path 66. The Return and ISB instructions cause similar logical 1 flag signals on paths 67 and 68 respectively. The hexadecimal codes beneath each alphabetic label in FIG. 3 are simply the codes which must be placed in OP code field 61 to cause the associated output signal on path 65-68 to occur. Segments containing instructions will be referred to as first segments. Those containing data will be called second segments.

There are many instructions which cause the memory 11 to be read. Any one of these cause a logical 1 read class flag signal to be placed on path 69, and the "READ CLASS" caption placed beneath the representation of that signal path indicates this. Similarly, a "WRITE CLASS" caption is placed adjacent path 70 to indicate that path 70 carries a logical 1 signal when a write class operation is present in instruction register 60.

Figure 2A:
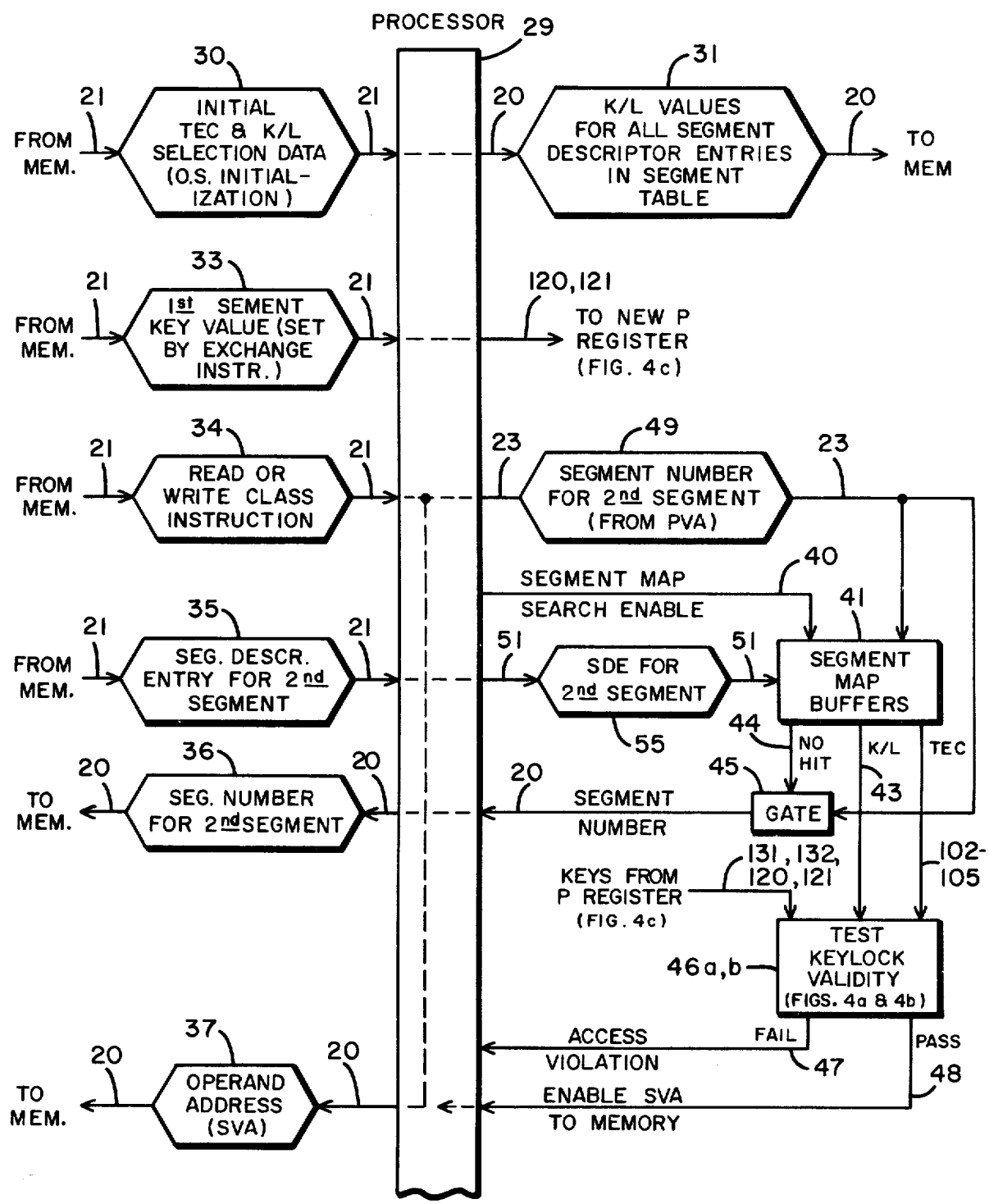
FIGS. 2a and 2b comprise a block diagram of apparatus implementing the invention.
Figure 2B:
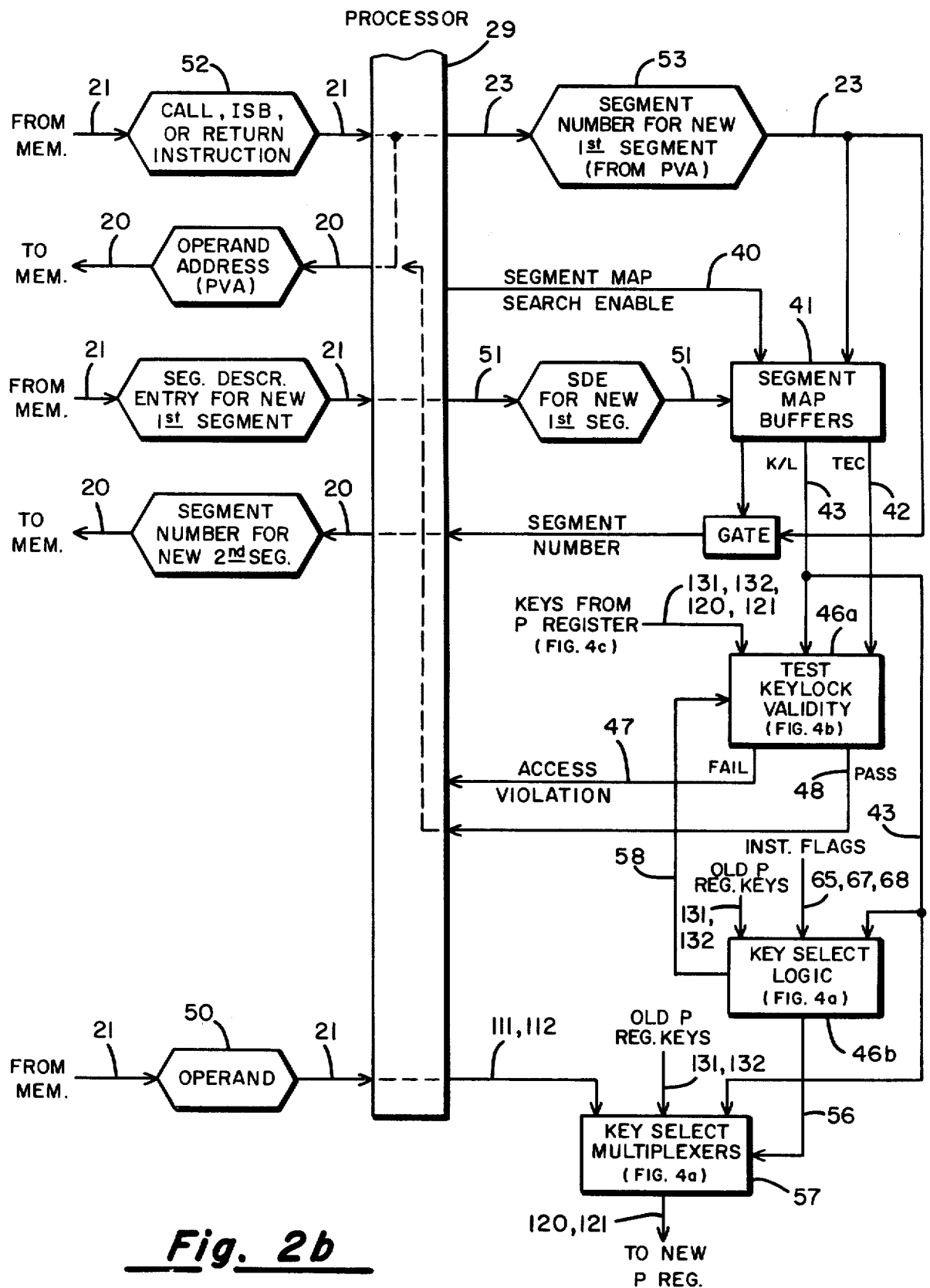

In FIGS. 2a and 2b, the block diagram representation of the preferred embodiment of this invention employs certain conventions which must be understood in order to understand the invention itself. The use of these conventions is deemed necessary again, because of the difficulty in depicting the operation of the microprocessor control functions and the constant references to memory 10 required by this invention and performed under microprocessor control. The hexagonal boxes 30, 33, etc. represent data transfer to or from memory port 19 on data paths 20 and 21 respectively. The content or meaning of the data transferred for a particular aspect of the implementation is stated within the hexagonal box. Those hexagonal boxes which are connected by dotted lines within the rectangle representing processor 29 are related in some fashion. These relationships will be described in the following discussion.

Hexagonal box 30 indicates the transfer of the initial test enable codes and K/L selection data to the segment tables 11. This information ultimately is supplied by the manager of the computing system facility. This is necessary, because the philosophy for protecting users from themselves and each other is based on the concept that there exists some ultimate authority which cannot be subverted. If this is not true, if there is not discipline and authority reposing in some trusted individual, one cannot expect any of the benefits explained herein to occur. The data represented by hexagonal box 30 is transmitted by processor 29 back to the segment tables 11 in memory 10, where they are inserted in the appropriate segment descriptor entries 12 by the operating system. When the appropriate values have been inserted in the segment tables 11, then normal processing can begin.

Hexagonal box 33 contains a description of the data transferred during an Exchange instruction. Recall that this is signaled by a logical 1 on path 66 in FIG. 3. Execution of the Exchange instruction causes the new P register values specified by the Exchange instruction to be read from memory and transmitted directly on paths 120 and 121 to the new P register rank 123 of P register 130.

Key validity testing during the Exchange instruction is not necessary. The computing system preferred for use with this invention has two different machine modes, monitor and job. Job mode is the normal state for user operations. Monitor mode is the normal state for the operating system. Execution of the Exchange instruction changes mode, from job to monitor or from monitor to job. When mode changes from monitor to job, the operand is transmitted to the new P register rank 123 (FIG. 4c) of P register 130. Execution then continues within the segment and at the instruction within the segment specified by the Exchange instruction operand. Contrarywise, when an Exchange instruction is executed during job mode, mode changes to monitor, and the new P register is loaded from a location which is inaccessible to processes operating in job mode, and which will undoubtedly be loaded by the facility manager with an address which transfers control to the operating system. Therefore, any attempt by the user to alter the key assignments through the use of Exchange instructions results in transfer of control to the operating system. If the operating system uses an Exchange instruction to transfer control to the user, it is appropriate that this device be used to alter the keys, since in essence the operating system is the facility manager's alter ego in its function of assigning keys to a particular user.

Execution of a typical sequence of instructions in a user program results in a series of individual instruction executions of the read or write class. Each such instruction execution begins with a memory reference which causes the particular instruction to be read from memory on path 21 and as symbolized by hexagonal box 34, to processor 29. Each such instruction-fetching memory reference need in general not be subjected to key-lock validity testing. One characteristic of the read and write class instruction is that their execution cannot change the segment from which instructions to be executed are drawn. Therefore, it is necessary to perform a key-lock validity test only when first entering a segment to begin executing instructions therefrom.

In the general case, each read or write class instruction which is transmitted to processor 29 during normal instruction execution contains one or more operand addresses. These addresses must be subjected to key-lock validity tests to prevent users from altering or extracting data from segments forbidden to them. It is convenient to refer to segments containing operands specified by instructions as second segments, to distinguish them from the first segments which are considered to contain executable code. (It is possible of course for a segment to contain both executable code and operands, but the possibility for programming errors to result in difficult debugging problems causes one to avoid this arrangement.) Each such read or write reference to a second segment, however defined, results in the key-lock validity checks. In the case of Call, ISB, and Return instructions, however, this terminology breaks down, since these instructions in effect change a second segment to first segment status. For clarity of explanation, I will use the term "new first segment" interchangeably with "second segment" when discussing these instructions.

The segment specified by each operand places the segment number on path 23, as indicated by the contents of hexagonal box 49. As explained earlier, the K/L field 15 of each segment is stored in that process's segment table in the index location for that particular segment. When the segment is a second segment and so intended to furnish operands for use during instruction execution, the K/L field functions as a lock value.

It is certainly possible to reference main memory 10 for each lock and PVA involved in the execution of a series of instructions. Such a multitude of main memory references, however, results in excessively slow instruction execution. Therefore, it is instead useful to employ a bank of segment map buffers 41 which contain for associative reference the segment descriptor entries 12 for the second segments which have been most recently referenced. The segment map buffers 41 are ultra high speed registers which cause no appreciable delay in instruction execution. Therefore in this embodiment, the execution of a read or write class instruction generates a segment map search enable on signal path 40 which causes segment map buffers 41 to be searched for the appropriate segment descriptor entry 12. If the SDE 12 is not present within segment map buffers 41, then a "no hit" signal on path 44 is generated. The no hit signal on path 44 enables gate 45 which allows the segment number on path 23 to be transmitted as a read request to memory 10 as shown in hexagonal box 36. This in turn generates the transmission of the segment descriptor entry 12 specified thereby, on path 21 as symbolized by hexagonal box 35. The entire segment descriptor entry 12 including the K/L field 15 and test enable codes 14 and 22 is transmitted on path 51 to segment map buffers 41 and stored therein. Path 51 is labeled as the SDE, hexagonal box 55, for completeness sake but in fact only the K/L and TEC fields are of interest in the explanation of this invention.

Once the segment descriptor entry 12 corresponding to the second segment referenced by the instruction operand is placed in segment map buffer 41, then the segment number symbolized by hexagonal box 49 and carried on path 23 to segment map buffers 41 will reference this SDE. Buffers 41 are caused by the segment number on path 23 to transmit the contents of its K/L field 15 and TEC fields 14 and 22 on paths 43 and 102-105 respectively to the test key-lock validity logic 46a,b. In addition, the global and local keys from old P register 128 are supplied to test logic 46a,b on paths 131 and 132 respectively. This logic performs the appropriate tests for implementing the earlier explanation and the keys either fail the tests in which case an access violation signal on path 47 is generated, or they pass the test, which causes an enable signal on path 48 to be generated which permits the operand address whose original receipt was symbolized by hexagonal box 34 to be supplied to memory, as symbolized by hexagonal box 37. The dotted line extension of signal path 48 symbolizes the gating of the operand address to path 20 by the signal on path 48, as interpreted in the processor 29 microcode.

As mentioned earlier, the three instructions in addition to the Exchange, which cause a change in the segment functioning as the first segment, i.e. the segment containing the instructions being executed, are the Call, the Inter-Segment Branch (ISB), and Return instructions. FIG. 2b comprises the block diagram of the portion of the computing system which executes these instructions. A substantial portion of the hardware involved in their execution is identical to that used for the execution for the read and write class instructions, and is therefore replicated symbolically in FIG. 2b. When an instruction fetch extracts one of these instructions from memory 10 on path 21, as symbolized by hexagonal box 52, the instruction is decoded within processor 29 by decoder 64 (FIG. 3) and the segment number for the new first segment (i.e., second segment) specified by the operand (PVA) of the instruction, and symbolized by hexagonal box 53, is supplied on path 23 to segment map buffers 41, as before. A similar series of operations occurs by which the K/L field 15 and TECs 14 and 22 from the segment descriptor entry 12 for the specified new first segment is again supplied to buffers 41 if the segment descriptor entry 12 for the new first segment is not already in buffers 41. Once the K/L field 15 and TECs 14 and 22 are available in buffers 41, they are supplied respectively on paths 43 and 102-105 to the test key-lock validity hardware 46a. Path 58 represents certain intermediate logic results available from the key select logic 46b, and useable in testing key-lock validity. So using these results reduces the total amount of logic required in testing and selecting the keys. These three instructions are tested in much the same fashion as are the read and write class instructions. Access violations are flagged by a signal on path 47 and operand fetch enabled by the signal on path 48.

There is for this second class of instructions the additional step, however, of selecting the new key values for the P register 130. The source for the new keys depends on the instruction flags 65, 67, and 68 which function as key selection signals; on the keys from old P register 128 on paths 131 and 132; and on the K/L field 15 from segment descriptor entry 12 available from the active process's segment table, and as explained earlier supplied on path 43. The key select logic 46b produces on path 56 a control word which is dependent on the inputs to logic 46b. The control word on path 56 controls the key select multiplexers 57. These multiplexers 57 can select keys from any one of several sources: old P register 128; special tables in memory 10 containing Return and Exchange instruction operands available on paths 111, 112; and the segment descriptor entry key/lock field available on path 43 from segment map buffers 41. The PVA specified by or a portion of the instruction being executed is supplied to memory on path 20 as the operand address and the memory returns the actual operand containing the key values applied to the input of multiplexers 57 on paths 111, 112. Depending on the control word carried by path 56, multiplexers 57 transmit one of the global keys carried on the inputs or 0, and one of the local keys supplied to its inputs or 0, to the global and local key fields 124 and 125 of new P register 123 on paths 120 and 121 respectively.

Call, Return and ISB Instructions

Figure 4A:
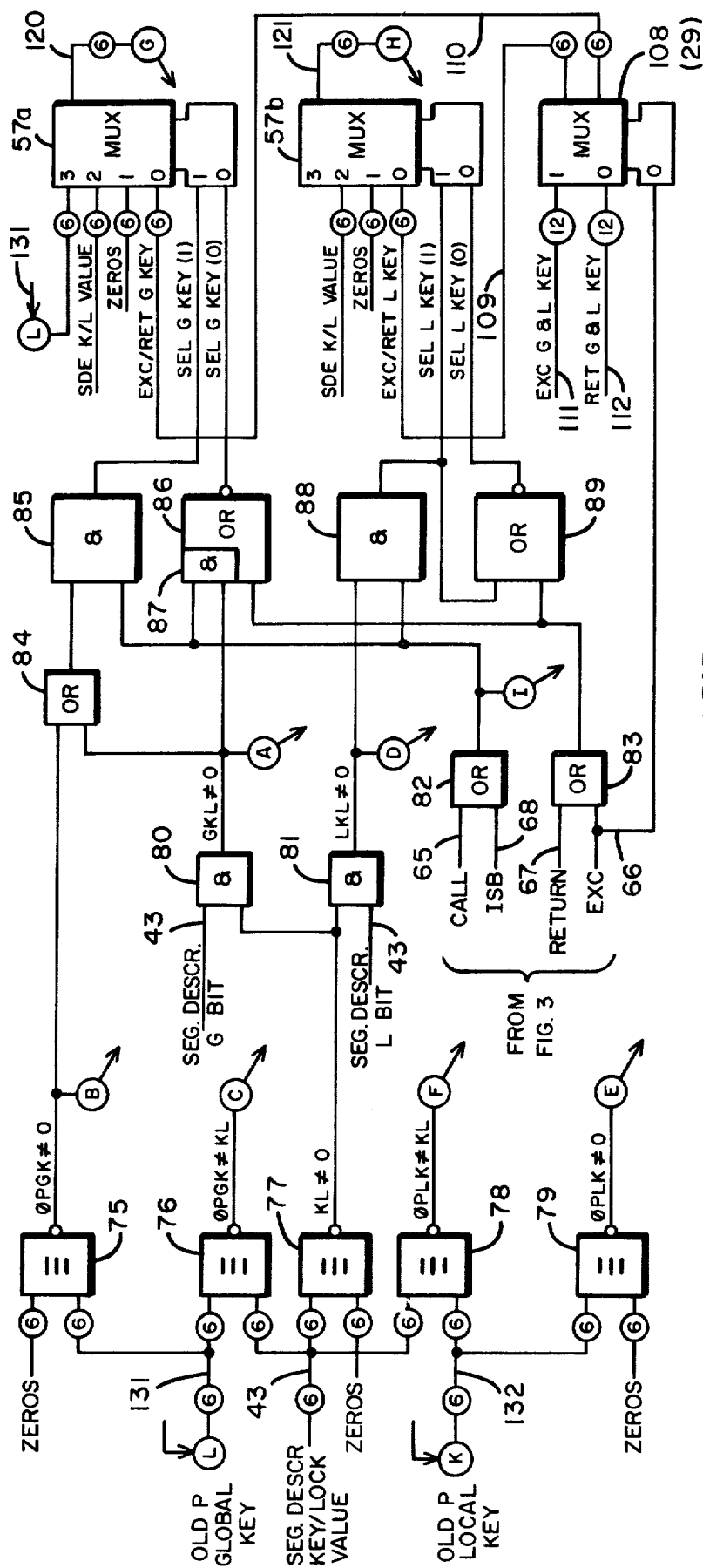

Before explaining the operation of the key validity testing and selection apparatus with reference to the detailed logic diagrams of FIGS. 4a, 4b, and 4c, it is useful to explain the operations and tests generated by the execution of each of these three instructions. Since the ISB and Call instructions are quite similar to each other, it is useful to discuss them together. In each case, the global key 129 (FIG. 4c) of the old P register 128 is compared with the global lock value 15 of the segment descriptor entry 12 associated with the new first segment (second segment), with interpretation of the G field 16 and consideration of the presence or absence of a master global key (0 or nonzero, respectively) included, to determine an access violation. Further, the K/L field 15 of segment descriptor entry 12 for the new first segment is interpreted to yield the new local key, which is transmitted to local key field 125 of new P register 123. Finally, the interpreted global lock value from segment descriptor entry 12 and the global key value from old P register 128 are both examined, and if both are not 0, then the nonzero value is transmitted to the new P register 123 global key field 124. Recall that if the global key value in field 129 of old P register 128 and the interpreted K/L field 15 value from segment descriptor entry 12 are both nonzero, they must equal each other in order to avoid an access violation which stops further execution of the instruction. These provisions prevent any user, by the artifice of executing an ISB or Call instruction, from defeating the key-lock protection restrictions imposed on him.

The Return instruction is essentially the complement of the Call instruction. The operands of all Return instructions are stored in a separate Return instruction push-down stack or table in memory 10, each containing the global key and local key from the P register 130 contents existing when the Call instruction for which the current Re turn instruction is the complement, was executed. The global and local keys from this pre-existing P register content are inserted in the global and local key fields 124 and 125 respectively of new P register 123. The local lock only from the Return instruction table is compared to the lock of the segment descriptor of the new first segment (second segment) and if not equal an access violation occurs. In essence, these steps, as far as the keys are concerned, restores the original condition of the keys prior to the Call to which this Return is paired.

Key and Lock Logic

In understanding the detailed logic diagrams shown in FIGS. 4a and 4b, it is useful to refer from time to time to the legend forming a portion of FIG. 4a for the meaning of certain abbreviations on signal paths and certain conventions implied in identifying the logic elements within these diagrams. In addition, small circles within which numerals are shown refer to a parallel transmission of data of the specified number of bits. All other paths carry logic signals. Circles containing letters are connectors and indicate continuity, letter to similar letter, in the signal path. The arrows affixed thereto indicate the direction of signal flow. Short captions placed adjacent many of the signal paths identify the meaning of the presence of a logical 1 thereon. Since these diagrams are at the logic level, all logic signals are binary, comprising logical 0's or 1's in every case.

The logic elements themselves are labeled with the function represented "&" for logical AND, and = for equality. A logical 1 output represents a "true" output. A small circle on the input or output represents a signal inversion.

Turning first to the diagram of FIG. 4a, the logic shown performs the key selection specified for the second class instructions viz. Call, ISB, Return and Exchange. The five equality test elements 75-79 test the equality of the pairs of six bit quantities applied to each of their inputs. If equal, the output is a logical 0 (because of the signal inversion symbol at the right hand, output side). If the two input quantities are unequal, the output is a logical 1.

Equality tester 75 receives a 6 bit 0 value on one input terminal and the old P register global key from field 129 (FIG. 4c) on path 131, and if this global key is 0 (i.e. the input pair is equal) produces a logical 0 and if not, a logical 1. Equality tester 76 receives the same global key from old P register 128 and the SDE 6 bit K/L value 18 available from segment map buffers 41 on a portion of path 43. If these two quantities are equal the output is a logical 0 and if not, a logical 1. Equality tester 77 also receives a 6 bit 0 quantity and the SDE 6 bit K/L value 18 from a portion of path 43 and roduces a logical 0 output if these two quantities are equal, and a logical 1 otherwise. In similar fashion, equality tester 78 tests SDE K/L value 18 with the old P local field 133 on path 132 key for equality and equality tester 79 tests the old P local key on path 132 against 0.

AND gates 80 and 81 each receive at one input the output of equality tester 77 which, as stated earlier is a logical 0 if the segment descriptor key lock value is 0 and logical 1 otherwise. The SDE global (G) and local (L) bits from fields 16 and 17 respectively of the segment descriptor entry 12 for the second or destination (new first) segment are available also on data path 43, and are applied respectively to the other of AND gate 80 and 81 inputs. The outputs of AND gates 80 and 81 are thus respectively a logical 1 if the global and local key/locks from the associated segment descriptor entry, with interpretation involving their global and local bit fields 16 and 17, are unequal to 0, as the captions show on the respective outputs.

If either the interpreted segment descriptor entry K/L value or the old P register global key on path 132 is unequal to 0, then OR gate 84, which receives the outputs of AND gate 80 and equality tester 75, supplies a logical 1 signal to AND gate 85. AND gate 85 also receives an input from the OR gate 82 output. OR gate 82 produces a logical 1 output if the instruction flags 65 and 68 applied to its inputs respectively indicate that the current instruction under execution is either a Call or an ISB instruction. The output of AND gate 85 forms the high order bit (bit 1) of the control word for the 2 bit multiplexer 57a.

The low order control word bit (bit 0) of multiplexer 57a is supplied in the following fashion: OR gate 83 receives the Return and Exchange instruction flags on paths 67 and 66 respectively and produces a logical 1 output if either of these instructions is being currently executed. This output is applied to one input of OR gate 86, and if a Return or Exchange instruction is being executed, the low order control bit of multiplexer 57a thus becomes a 0. (Note output signal inversion for gate 86.) This low order bit can also be set to 0 by satisfying both inputs to AND gate 87. The outputs of AND gate 80 and OR gate 82 are supplied to AND gate 87, satisfying it and producing a logical 1 output applied to the other input of OR gate 86 in case of the following conditions: either a Call or ISB instruction is being executed, and the global key/lock, with interpretation of the SDE G field 16 output, all from segment descriptor entry 12, is not 0. If these conditions all exist, then OR gate 86 supplies a logical 0 output to the low order bit of multiplexer 57a. If neither of these sets of input conditions to gate 86 are satisfied, then the output of OR gate 86 is a logical 1.

The two bits of the control word of multiplexer 57a specify four different possible sources for the output of multiplexer 57a on path 120. If outputs of AND gate 85 and OR gate 86 are both logical 0's, then the operand as specified by multiplexer 108(29) becomes the output on path 120. If the output of AND gate 85 is 0, and the output of OR gate 86 is 1, then 0's are gated to path 120. If the output of AND gate 85 is a logical 1 and OR gate 86 produces a logical 0 on its output terminal, then the segment descriptor entry K/L value in field 18 for the new first segment is gated to path 120. Finally, if both AND gate 85 and OR gate 86 produce logical 1's on their outputs, the global key field 129 in old P register 128 available on path 131 (connector L, FIG. 4c) is gated to output path 120. That is, the global key in the old P register is gated into the global key field 124 of new P register 123, in essence leaving the G key of P register 130 unchanged.

A similar analysis can be performed for the selection of the local key for the new P register 123. If AND gate 81 produces an output logical 1 (indicating that the local key/lock from the segment descriptor entry 12 for the new first segment, as interpreted by the associated L bit in field 17, is not equal to 0) and the instruction being executed is either a Call or an ISB instruction (OR gate 82), then AND gate 88 produces a logical 1. In any other case, AND gate 88 produces a logical 0. The output of AND gate 88 forms the high order bit of the control word for multiplexer 57b.

The low order control word bit for multiplexer 57b is supplied by OR gate 89. If the output of AND gate 88 is a logical 1 or the instruction is either a Return or Exchange instruction (as determined by OR gate 83 and carried its output), then OR gate 89 produces a logical 0. In all other cases, it produces a logical 1. Note that the outputs of gates 88 and 89 cannot simultaneously be logical 1. Therefore, there is no input needed for input port 3 of multiplexer 57b.

As with multiplexer 57a, which of the data inputs of multiplexer 57b is gated to path 121 depends on the control word bit pattern. If both AND gate 88 and OR gate 89 produce logical 0's, then the output of multiplexer 108(29) is gated to data path 121. If the output AND gate 88 is 0 and that of OR gate 89 is 1, then 0's are transmitted to data path 121. If AND gate 88 output and OR gate 89 output are respectively 1 and 0, then the segment descriptor K/L value field 18 becomes the output on path 121.

Two-input multiplexer 108(29) supplies one global and one local key pattern respectively to the inputs of multiplexers 57a and 57b, under the control of the Exchange instruction flag on path 66. The parenthetical 29 in this multiplexer's reference number is simply to indicate that in the preferred embodiment shown here, its function is implemented in microcode by processor 29. The Exchange instruction flag on path 66 is supplied to the control terminal of multiplexer 108(29). Recalling that only one of the instruction flags on paths 65–68 can be a logical 1 at a time, this provides a logical 1 input to the control bit of multiplexer 108(29) when the Exchange instruction is being executed, and a logical 0 otherwise.

The source for the output of multiplexer 108(29) when its control bit is 0, is the global and local key supplied by memory 10 on path 112, and associated with the Call instruction which the current Return instruction complements. The output of multiplexer 108(29) is split into the global key on path 110 for input port 0 of multiplexer 57a and the local key on path 109 for input port 0 of multiplexer 57b. When the Exchange instruction flag on path 66 is a logical 1, then the global and local keys stored for the Exchange instruction are supplied from memory 10 on path 111, and are transmitted on paths 110 and 109 respectively to multiplexers 57a and 57b.

Turning next to FIG. 4b, this logic diagram implements the validity testing necessary to determine access violations. Additional testing of key and K/L values occurs by the operation of equality testers 90–92. The segment descriptor entry K/L value 18 on path 43 is applied to one each of the input terminals of equality testers 90 and 91. If the new P register 123 global key available on path 120 from the apparatus of FIG. 4a equals the uninterpreted segment descriptor entry K/L value on path 43 (field 18 of SDE 12), then equality tester 90 produces a logical 0. If the new P register local key available on path 121 equals the segment descriptor entry key/lock value from path 43, then equality tester 91 produces a logical 0. And finally, if the new P register local key on path 121 is 0, then equality tester 92 produces a logical 0 at its output. Naturally, if any of the above specified conditions do not occur, then the corresponding output of the associated equality tester is a logical 1.

If the new P register 128 local key (FIG. 4a, path 121) does not equal the segment descriptor entry K/L field 18 contents for the new first segment and a return instruction is being executed, and either the interpreted segment descriptor local lock value or the new P register local key (field 125, path 121) are unequal to 0 (OR gate 106), then AND gate 100 is satisfied and OR gate 101 produces a logical 1 output indicative of an access violation. Note connector D's role in symbolically connecting the output of FIG. 4a's AND gate 81 to the input of OR gate 106.

If the output of equality tester 90 is a logical 1, the SDE global key with interpretation by the associated G bit 16 is not equal to 0, and a Return instruction is being executed as indicated by a logical 1 on path 67 (FIG. 3), AND gate 99 produces a logical 1 output which OR gate 101 places on path 47, again indicating an access violation.

There are also certain circumstances where key-lock validity testing is not to happen. This occurs with respect to read and write class instructions. As explained earlier, assume that when the read test enable code (TEC) bits in field 14 or the write TEC bits in field 22 of a segment descriptor entry 12 for the operand of an instruction being executed are a binary 01, then key testing is enabled respectively for read and write class instructions. When read class key-lock testing is enabled by this bit pattern, then a logical 0 is applied to path 102 and a logical 1 is applied to path 103, forming inputs for AND gate 94. Similarly, if key-lock testing is specified for write class instructions, then paths 104 and 105 respectively are assumed to carry a logical 0 and logical 1 to the AND gate 93 inputs shown. AND gates 94 and 93 also respectively receive at a third input the read class instruction flag on path 69 and the write class instruction flag on path 70 both produced by the apparatus of FIG. 3. A logical 1 output from AND gate 94 means that key-lock testing is to occur for read class instructions. A logical 1 at the output of AND gate 93 means that key-lock testing shall occur for the execution of each write class instruction.

OR gate 95 receives the outputs of AND gates 94 and 93 and supplies its output to one input each of OR gate 96 and AND gate 98. The output of OR gate 95 is a logical 1 when read or write key-lock testing is to occur, as indicated by the caption adjacent. If in addition: the interpreted segment descriptor entry local key/lock value is unequal to 0 (output of AND gate 81, FIG. 4a); the old P register local key (field 133, path 132) is unequal to 0 (equality tester 79 output) and is also unequal to the segment descriptor entry key/lock value field 18 available on path 43 (that is, without interpretation by the local or global bit fields associated therewith); then all four inputs of AND gate 98 are set to logical 1 and a logical 1 is applied by AND gate 98 to OR gate 101. This constitutes another condition designating an access violation producing a logical 1 on path 47.

The last condition comprising an access violation involves the global key-lock tests. If the instruction is a Call or ISB type or OR gate 95 output is a logical 1 then testing of the global key against the segment descriptor key/lock value, field 18, is specified, as indicated by a logical 1 output from OR gate 96. Additionally, if the interpreted global key/lock value is unequal to 0 (AND gate 80 output equal to logical 1), the old P register global key on path 132 is equal to 0 (output of equality tester 75 equal to logical 1), and the old P register global key is unequal to the segment descriptor key/lock value as interpreted by the global key field 16 of the segment descriptor entry (output of equality testor 76), then the conditions for failure of the global key-lock test have been established and the output of AND gate 97 is set to a logical 1. OR gate 101 again produces a logical 1 output on path 47 indicating an access violation.

In FIG. 4c, the gating of the contents of new P register 123 to old P register 128 occurs under processor 29 microcode control, hence the reference number for OR gate 126(29). P register gate 134 is integral with the double rank structure preferred for P register 130, where old and new P registers 123 and 128 comprise the two ranks. When a logical 1 is applied on path 135 to the control terminal of gate 134, then the contents of old P register rank 123 is transmitted to new P register new P register rank 128. Processor 29 implements the OR gate 126(29) function, receiving the read and write class instruction flags on paths 69 and 70 respectively, and the access violation signal on path 47. If any of these conditions are present, no such transmission can occur. (Since read and write class instructions do not affect keys, no transmission of the old to the new P register is necessary.) In addition, there are a myriad of other conditions, as symbolically indicated on path 127, which may also result in preventing any transmission from new P register 123 to old P register 128. Once all conditions have been satisfied for this transmission, then a clock pulse allows gate 134 to allow the data in new P register 123 to move into old P register 128, at the very end of the execution of the current instruction. This prepares the machine for the execution of the next instruction in sequence, or as designated by the currently executing instruction if it is one which is of the type interrupting the execution sequence. Global key field 129 and local key field 133 receive the output multiplexers 57a and 57b have respectively placed on paths 120 and 121 and loaded into new P register 123 global and local key fields 124 and 125, all respectively.

In this fashion key testing occurs and keys are selected to provide a useful means for protecting the data and instructions within a computing system employing my invention.

The preceding details the manner in which my invention is implemented in a preferred embodiment. What I wish to claim by letters patent is:

1. In a data processing system of the type including: (a) a memory comprising a plurality of addressable cells and a data port, said cells grouped into a plurality of segments, each segment having a unique number forming a portion of the addresses of the cells in the segment, said memory accessed by externally supplied address signals each encoding the address of the cell to be referenced and specifying the memory function, said memory accepting data for storage at and supplying stored data at the data port responsive to, respectively write address signals and read address signals, said memory further having when in use, an instruction sequence stored in at least one first segment and including memory references to at least one second segment; and (b) an instruction processor supplying read address signals encoding the addresses of the instruction sequences to the memory and responsive thereto receiving the addressed instructions from the memory at its data port and executing them, and responsive to execution of certain ones of the instructions, generating address signals encoding addresses of cells located in at least one second segment, an improvement comprising means for storing in the memory for at least each referenced second segment, an externally supplied numeric key/lock value in a cell having a preselected location associated with the second segment involved, and wherein the instruction processor further includes the improvement of:

(a) means for extracting from the memory at least one numeric key value to be associated with each first segment, and for storing each said key value; and (b) key retrieval and comparison means for receiving the address signals encoding the addresses of cells grouped in at least one second segment, and responsive thereto supplying to the memory a read address signal encoding the address of the cell containing the numeric key/lock value for the specified second segment, and receiving that key/lock value at the data port of the memory, and for receiving the key value stored by the key selecting and storing means and comparing said key value with the key/lock value, and if not valid generating an access violation signal, but if valid transmitting the address signal to the memory.

2. The system of claim 1, wherein the processor further comprises means for comparing the key/lock value received from the memory and the key value stored by the key selecting and storing means and if either equals a preselected master value, inhibiting the generation of the access violation signal.

3. The system of claim 2, wherein the means for comparing the key and key/lock values with a preselected master value comprise means for comparing the key and key/lock values to a preselected master key value of 0.

4. The system of claim 2, wherein the key value selecting and storing means further comprises means responsive to a key selection signal for comparing each of the current key value and the key/lock value for the second segment, with the preselected master value and whenever only one of said key/lock and current key values are equal to the predetermined master value, storing the one of the key/lock and current key values unequal to the predetermined master key value as a new key value;

and wherein the instruction processor further includes means for sensing preselected ones of the instructions and issuing key selection signals to the key storing means responsive thereto.

5. The system of claim 4, wherein the key value selecting means further comprises means for comparing the key and key/lock values to a preselected master key value of 0.

6. The system of claim 2, wherein the key/lock storing means includes means for storing with each key/lock value, a global designator flag and a local designator flag; wherein the key selecting and storing means includes means for selecting and storing global and local key values, and wherein the key retrieval and comparison means comprises means for comparing at least one of the global and local key values to the key/lock value for the second segment, and if said key/lock value is unequal to at least one of the key values and the designator flag corresponding to each unequal key value is unequal to 0, issuing an access violation signal.

7. The system of claim 6, wherein the key retrieval and comparison means further comprises means for comparing the key/lock value for the second segment to both the global and local key values stored by the key selecting and storing means, and if the key/lock value for the second segment is unequal to the preselected master value and to at least one of the global and local key values unequal to the preselected master value, and the corresponding designator flag stored with the key/lock value is unequal to 0, issuing an access violation signal.

8. The system of claim 2 wherein the key selecting and storing means further comprises segment call means responsive to a call flag signal for comparing the key/lock value at the data port from the memory with the preselected master value, and when said key/lock value is unequal to the preselected master value, for setting the key value to said key/lock value; and wherein the processor further comprises means for supplying a call flag signal responsive to execution of certain ones of the instructions.

* * * * *